F. R. SUNDERMAN AND W. H. SHIMPF.
INTERNAL COMBUSTION ENGINE.
APPLICATION FILED APR. 12, 1918.

1,388,444.

Patented Aug. 23, 1921.
6 SHEETS—SHEET 1.

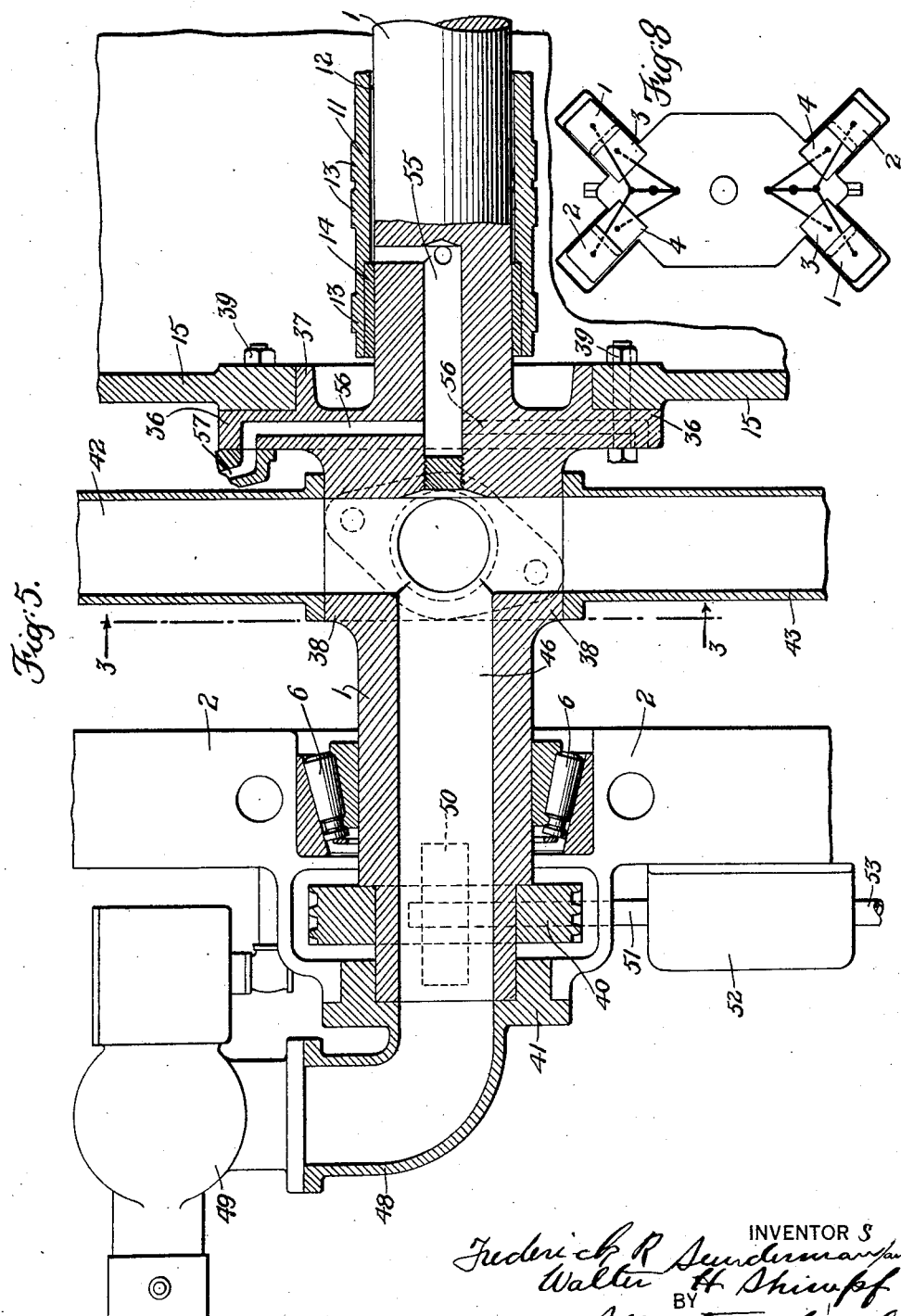

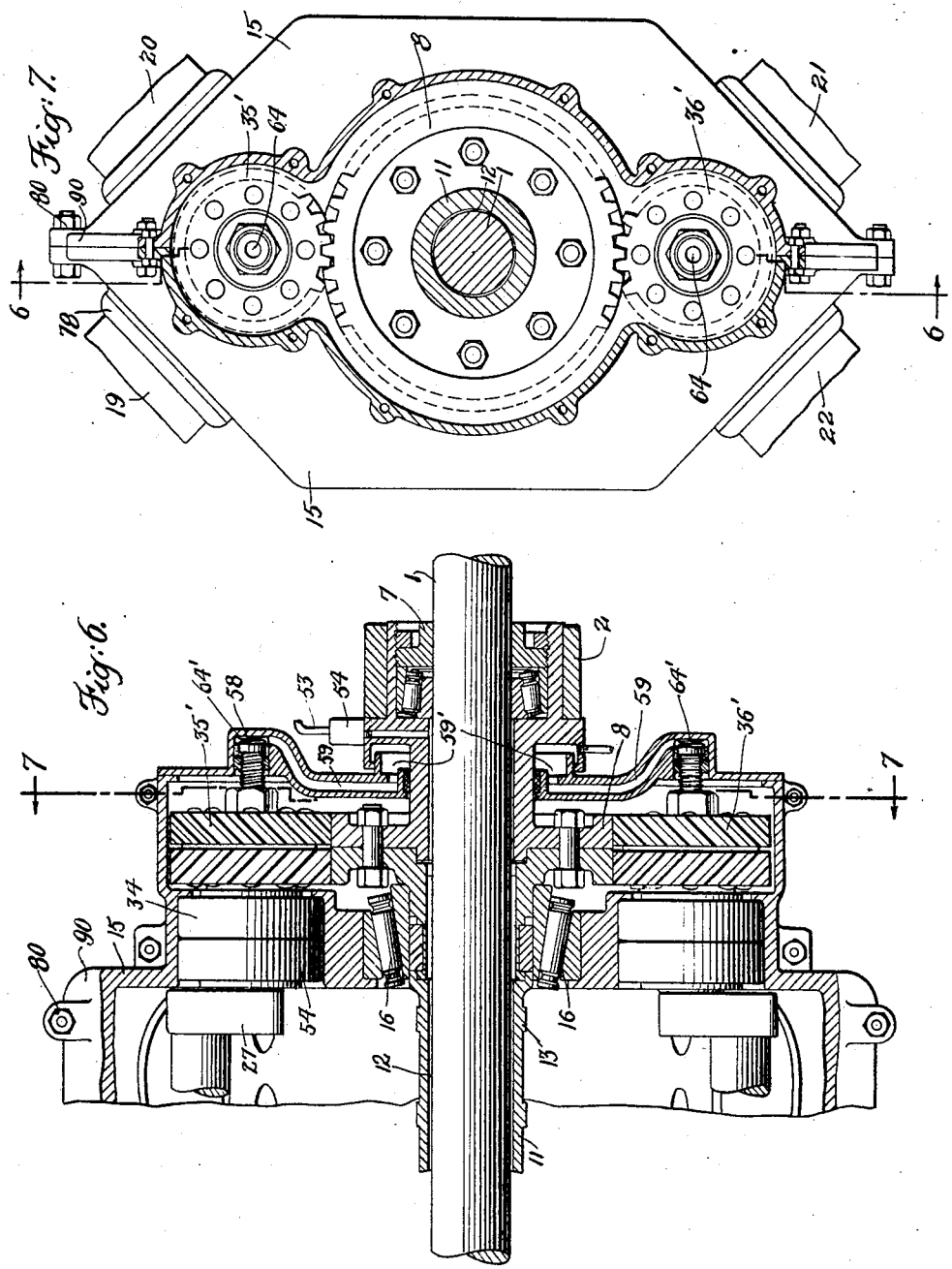

UNITED STATES PATENT OFFICE.

FREDERICK R. SUNDERMAN AND WALTER H. SHIMPF, OF DETROIT, MICHIGAN, ASSIGNORS TO SUNDERMAN CORPORATION, OF NEWBURGH, NEW YORK, A CORPORATION OF NEW YORK.

INTERNAL-COMBUSTION ENGINE.

1,388,444. Specification of Letters Patent. Patented Aug. 23, 1921.

Application filed April 12, 1918. Serial No. 228,125.

*To all whom it may concern:*

Be it known that we, FREDERICK R. SUNDERMAN, a citizen of the United States, and a resident of Detroit, in the county of Wayne and State of Michigan, and WALTER H. SHIMPF, a citizen of the United States, and a resident of Detroit, in the county of Wayne and State of Michigan, have invented certain new and useful Improvements in Internal-Combustion Engines, of which the following is a specification.

This invention relates to rotary internal combustion engines, and more particularly to that type of engine having cylinders and driving pistons rotatable with the engine about a central axis. One of the objects of the invention is to provide a durable and efficient engine of the above type.

Other objects of the invention are to provide an engine of great power for given weight; to provide an engine well balanced about its axis of rotation both as regards weight and operation; to provide a plurality of groups of cylinders arranged concentrically of the axis of a rotatable frame, the pistons of each group being connected to a separate crank shaft and the cylinders being fired consecutively, each once for every rotation of the frame; to provide a four-cycle engine having eight cylinders arranged concentrically on a frame rotatable about a single axis with means for causing each cylinder to fire at least once during each rotation of the frame and in such sequence that a cylinder will be fired for each forty-five degree rotation of the frame.

The invention consists in the novel arrangement, construction and combination of parts which are hereinafter described and more particularly pointed out in the appended claims.

This invention is in the nature of an improvement on the invention shown and described in the co-pending application of Frederick R. Sunderman, for rotary internal combustion engine, Serial No. 74,305, filed January 26, 1916.

Further objects and advantages of the invention will more fully appear from the following description taken in connection with the accompanying drawings illustrating its preferred embodiment and in which—

Fig. 5 shows an enlarged section on line 5—5 of Fig. 3.

Fig. 6 is a section on line 6—6 of Fig. 7 and

Fig. 7 is a view on the line 7—7 of Fig. 6.

Fig. 8 is a diagrammatic illustration of the position of the various cylinders.

Fig. 9 is a diagram of connections of the magneto and ignition system.

Figure 1:
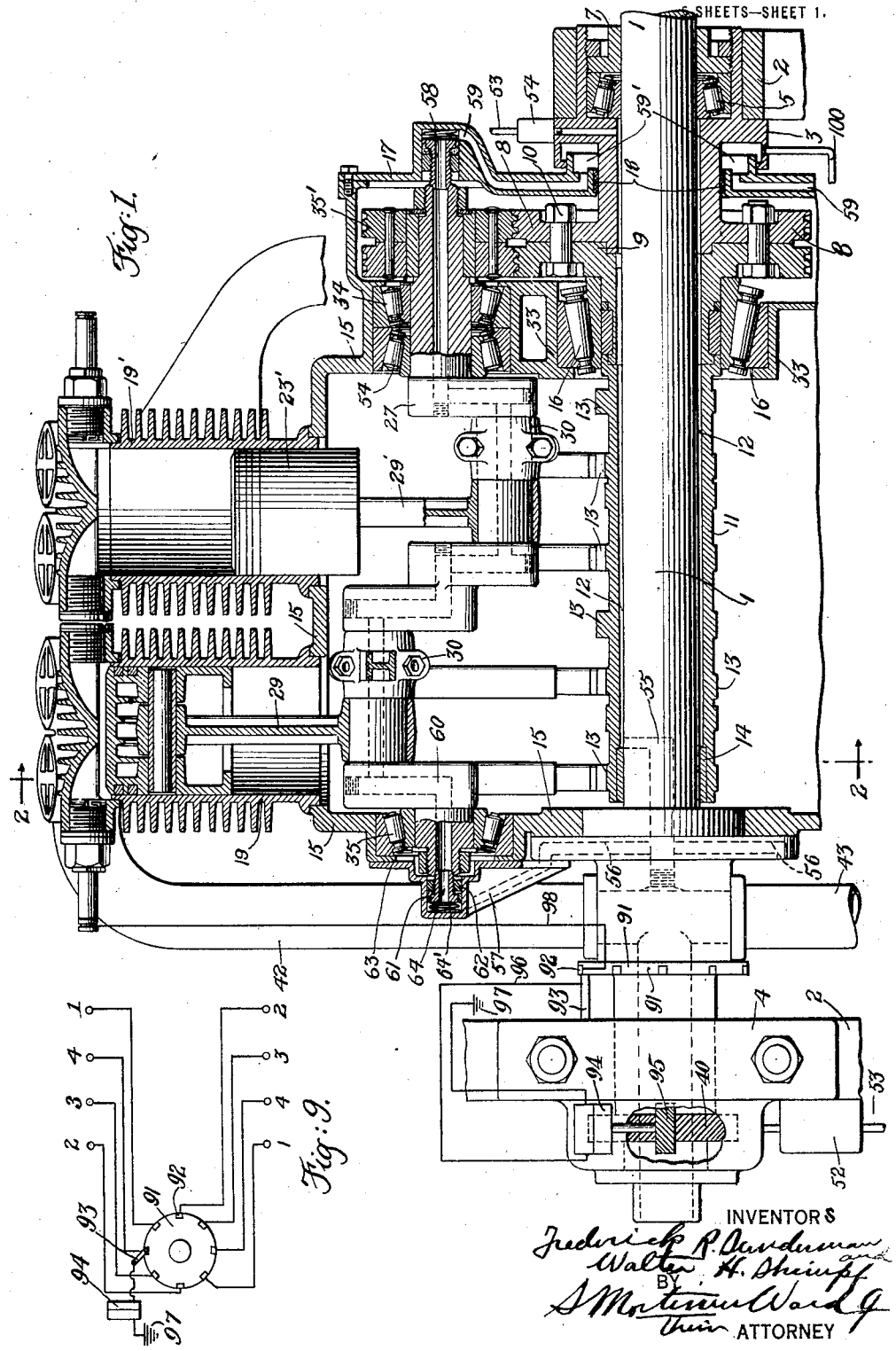
Figure 1 is a partial longitudinal section and Fig. 2 is a transverse section on line 2—2 of Fig. 1.
Figure 2:
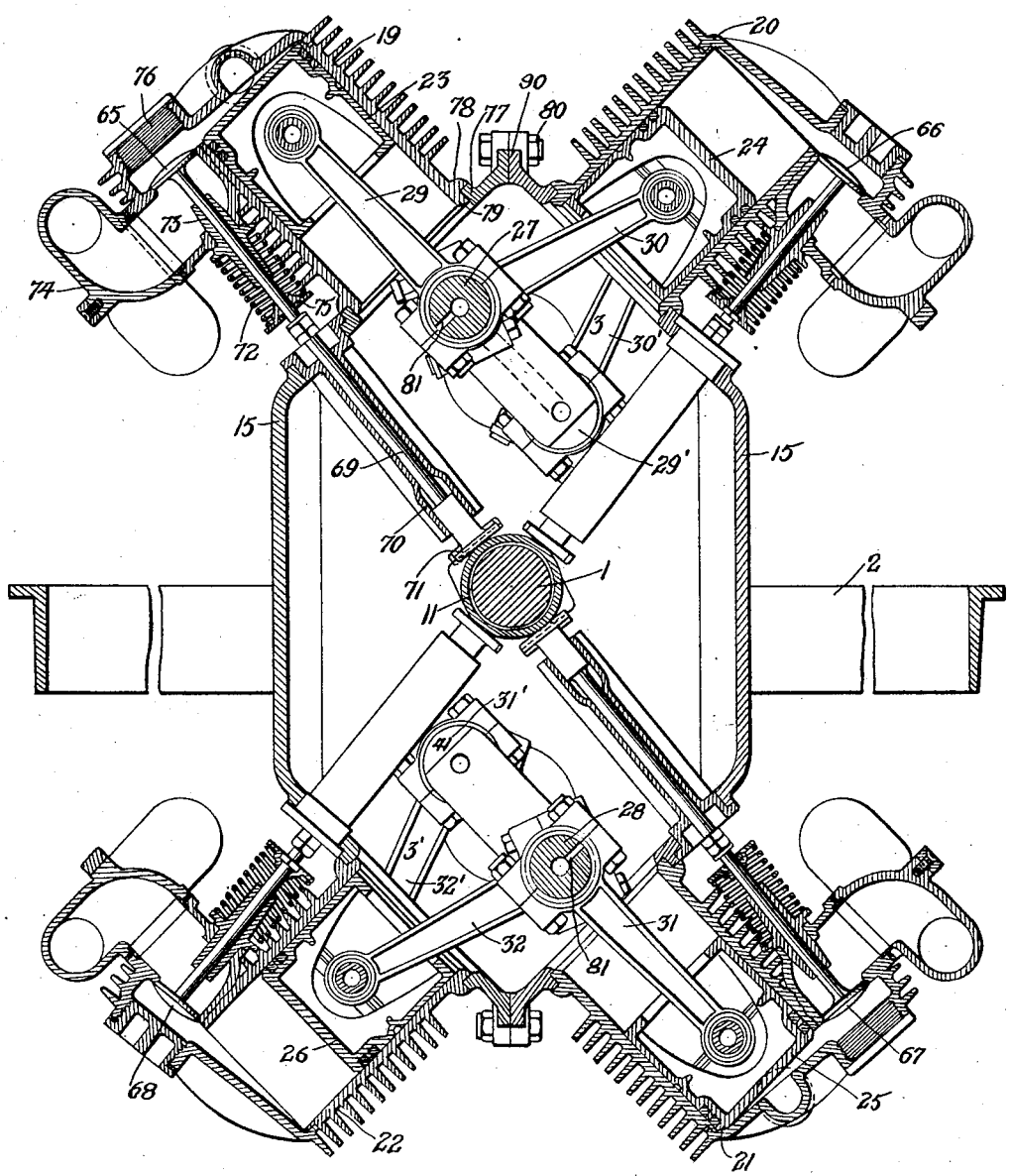

Referring to Figs. 1 and 2, 1 is the main shaft suitably supported by the framework 2. The shaft 1 is rotatively supported by projections or pillow-blocks 3 and 4, one at each end. In the pillow-block 3 (Fig. 1) is a roller bearing 5 and in the pillow-block 4 is a roller bearing 6, as shown in Fig. 5. The end of the pillow-block 3 is closed by a bearing ring 7 of suitable material, which is screw-threaded into the end of the pillow-block 3. Integrally formed with the block 3 is one half of a herring-bone gear 8. The other half 9 of this gear is bolted to the part 8 by bolts 10. Extending along substantially the entire length of shaft 1, shown in Fig. 1, is a stationary sleeve 11 of such diameter as to leave a space 12 between the sleeve 11 and the shaft; the purpose of this space will be described later. This sleeve 11 is provided with a number of cams 13, the purpose of which will be hereinafter explained. The left hand end of the sleeve, as shown in Fig. 1, is closed by bearing material 14 fitting snugly around the shaft 1, so as to form an oil tight joint.

A frame rotatable support or frame 15 is located around the shaft 1 and sleeve 11 (see Figs. 1, 3, 6 and 7) and is supported by a roller bearing 16 which rests partially upon the sleeve 11 and partially upon the annular part of the left hand half 9 of the gear 8. The frame 15 is hexagonal in shape and the right hand end thereof is closed by a member 17 of suitable form and encircles the pillow-block 3 outside the herring-bone gear 8. The member 17 is provided with bearing material 18 around the pillow-block 3. Suitably attached to the frame 15 are a plurality of cylinders 19, 20, 21 and 22, as shown in Fig. 2. Directly back of the cylinder 19 as it appears in Fig. 2 is a cylinder 19′, shown in Fig. 1. There is likewise a cylinder back of each of the cylinders 20, 21 and 22 but these are not shown in the drawings as they would be mere duplications of the cylinders 19 and 19′. These cylinders have pistons 23, 24, 25 and 26 and 23′ 24′, 25′ and 26′, respectively, and each of the pistons is connected with a crank shaft.

Referring to Fig 2, it will be seen that there are two crank shafts 27 and 28 located diametrically opposite each other with respect to the shaft 1. The pistons 23, 24 and 23′ and 24′ are connected to the crank shaft 27 by means of piston rods 29, 30, and 29′ and 30′; likewise the pistons 25, 26, 25′ and 26′ are connected with the crank shaft 28 by means of piston rods 31, 32, 31′ and 32′. The pistons 23 and 23′, 24 and 24′, 25 and 25′, 26 and 26′ are connected to their respective crank shafts 180° apart, that is to say, when for instance the piston 23 is all the way in the cylinder 19, the piston 23′ is all the way out in the cylinder 19′. The pistons of any pair, such as the pair of cylinders 19 and 19′ and the pistons of the other pair connected to the same crank shaft as for instance of the cylinders 20 and 20′ are connected to the crank shaft 27, 90° apart so that when the pistons 23 and 23′ are as above described and as shown at the upper left-hand corner of Fig. 2, the pistons 24 and 24′ will be one-half of their maximum distance out of their respective cylinders, as shown in the upper right-hand corner of Fig. 2 and in Fig. 8. The relation of the cylinders in the group connected to crank shaft 28 is exactly the same as that previously described with respect to the pistons on the crank shaft 27. This arrangement of the cylinders and the connections of the pistons is important because it permits of each cylinder firing before the piston in the preceding one to fire, has moved over two-thirds of its stroke, and the arrangement further insures the resultant center of gravity of the pistons being kept substantially constant and thereby a good mechanical balance of the revolving frame is secured. The crank shafts 27 and 28 are journaled in a roller bearing 34 (Figs. 1, 6 and 7) at the right-hand end, between the frame 15 and the member 33, which member 33 coöperates with the roller bearing 16 on the sleeve 11 surrounding the main shaft 1. These crank shafts are journaled in the frame 15 at their left-hand end by means of the roller bearing 35. Each of these crank shafts is provided at its right with a pinion, one 35′ and the other 36′, both of which mesh with the stationary gear 8.

The revolving frame 15 together with the cylinders and crank shafts, is permanently connected with the shaft 1, as shown in an enlarged view of that end of the shaft in Fig. 5. Referring to this figure, it will be seen that the shaft 1 is provided with a flange 36. The flange 36 has an annular projection 37 thereon against which the frame 15 rests. The frame 15 is attached to the flange 36 by means of bolts 39. The shaft 1 also has a squared portion 38 to the left of the flange 36 as shown in Fig. 5, and the portion of the shaft 1 extending to the left of the squared portion is somewhat enlarged and is hollowed out as shown in Fig. 5. The enlarged portion is journaled in a pillow-block 4 by means of the roller bearing 6. The shaft 1 is reduced near its end and a worm gear 40 is mounted thereon. The end of the shaft 1 extends into a stationary member 41 and is so fitted therein as to render the joint between the two gas tight.

Figure 3:
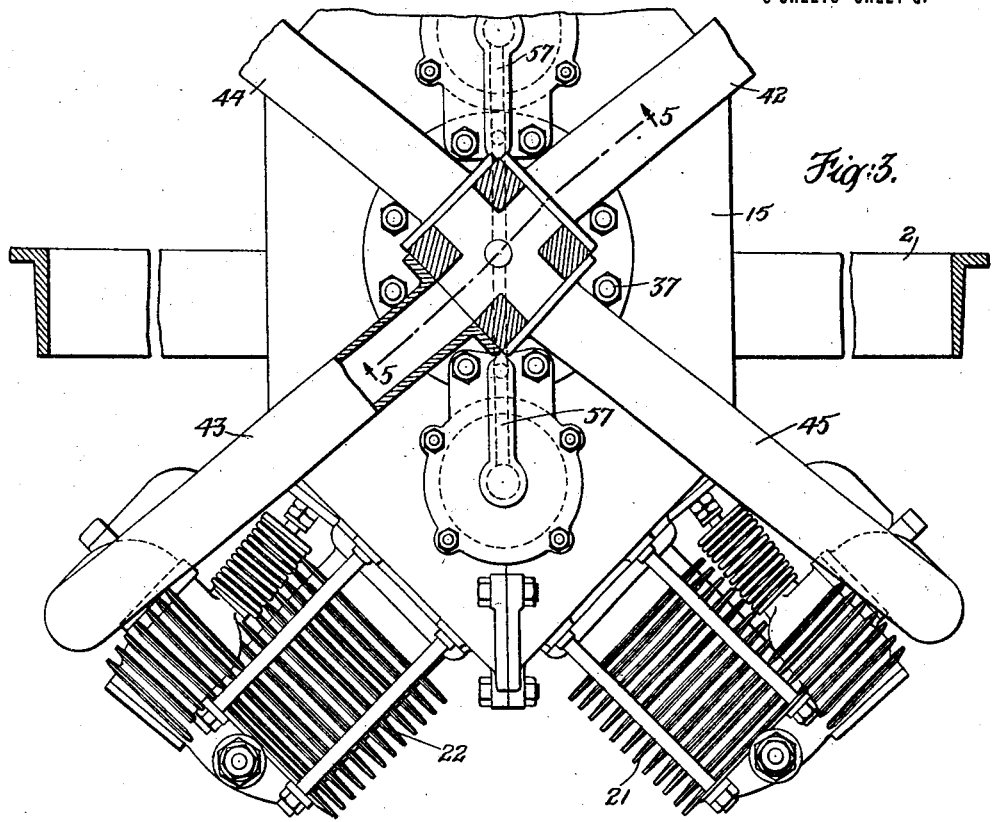
Fig. 3 is a section on line 3—3 of Fig. 5.
Figure 4:
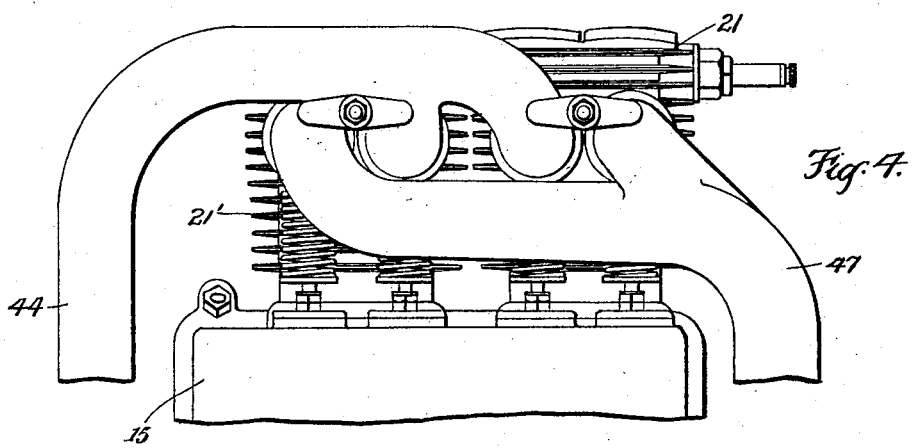
Fig. 4 shows a side view of one pair of cylinders especially showing the inlet and exhaust passages.

Attached to the squared portion 38 of the shaft 1 are four pipes 42, 43, 44 and 45 (Figs. 3, 4 and 5). Each of these pipes communicates with the conduit 46 in the end of the shaft 1 through an opening therein. Each of these pipes leads to the in-take side of one pair of adjacent cylinders, as shown in Fig. 4. Leading from each pair of cylinders is an exhaust conduit 47, as shown in Fig. 4. Communicating with the conduit 46 in the shaft 1 (Fig. 5) is a suitable carbureter 49 which operates in the ordinary fashion.

Connected with the worm gear 40 is a gear 50 shown in dotted lines in Fig. 5. The gear 50 is connected by means of a shaft 51 with an oil pump 52. A pipe 53 is connected with the oil pump and leads from the left hand end of Fig. 1 to the point 54 at the right hand end of Fig. 1. The oil is therefore supplied under pressure from the pump 52 into the point 54. From the point 54 it is forced through the space 12 between the shaft 1 and the sleeve 11 back to the left hand end of Fig. 1 and into the opening 55 in the shaft 1 as shown more clearly in Fig. 5. From the opening 55 in the shaft the oil is forced into the conduits 56 in the flange 36 and from these conduits the oil is led by conduits 57 into the crank shafts 27 and 28. These crank shafts are hollowed out throughout their entire length and the oil is forced through these shafts returning to the point 58 shown on crank shafts 27 and to a similar point on crank shaft 28 which is not shown in Fig. 1. From the point 58 the oil is taken by a passage 59 (Fig. 6) into chamber 59′ and from a similar point on the crank shaft 28 the oil is taken by a similar passage 59 to the chamber 59' and is returned from there to a reservoir by pipe 100 from which it is again pumped out through the system by the pump 52. The connecting rod pins are lubricated from the oil passing through the two crank shafts by means of suitable openings 81 and the pistons are lubricated from the splash thrown off by the connecting rods.

Each end of both crank shafts is connected to its oil passage in the same manner and therefore a description of one is sufficient for all. By referring to Fig. 1, the left hand end of crank shaft 27, it will be seen that the crank shaft is hollowed out at 60. Bearing in this hollowed out portion is a plug 61 screw-threaded into a collar 62 which is attached by means of the member 63 with the frame 15. The plug 61 itself has an opening 64 through which it communicates at one end with the conduit 57 and at the other end with the conduit 60 through the crank shaft. This plug is mounted so that it is oil tight with respect to both the collar 62 and the conduit 60 in the crank shaft 27. Bearing against the plug 61 is a compression spring 64'.

The inlet and exhaust ports of the cylinders are controlled by puppet valves. The exhaust valves only are shown in the drawings. These are best shown in Fig. 2. The exhaust valve for cylinder 19 is numbered 65, that for cylinder 20 is 66, that for cylinder 21 is 67 and that for cylinder 22 is 68. These various valves are controlled by valve rods all of which are exactly alike and therefore a description of one will be sufficient. The valve 65 for instance is operated by the rod 69. This rod 69 is surrounded by a sleeve 70 fastened in the frame 15. The lower end of the rod is provided with a bearing surface 71 which rests upon one of the cams 13 on the cam shaft or sleeve 11. Surrounding the rod 69 is a compression spring 72, one end of which presses against an elongated bushing 73 surrounding the upper end of the rod 69 and fastened in a discharge conduit 74 which is rigidly attached to the side of the cylinder 19. The other end of the spring rests against a collar 75 which is rigidly attached to the rod 69 so that when the cam on the shaft 11 pushes the rod up to open the valve the spring tends to close the valve and does so after the frame has revolved sufficiently to remove the cam from the bearing portion 71. Screw-threaded into the head of the cylinder 19 is a cap or plug 76 immediately over the valve 65 so that upon the removal of the plug 76, the valve may be ground or repaired or adjusted.

By reference to Fig. 2, it will be seen that the frame 15 is of a generally hexagonal shape with two sides thereof, that is the vertical sides as shown in Fig. 2 substantially longer than the other sides. This frame is made up of two symmetrical parts united by means of bolts 80 extending through a flange on each of the members. The cylinders are mounted in pairs, one behind the other on the normal sides of the frame and are arranged so that the cylinders of two adjacent pairs are at 90° with respect to each other. These cylinders are all attached to the frame by providing an upturned flange 77 on the frame and providing an annular projection 78 on the cylinders to butt against the upturned portion 77 of the frame. The part 79 of the cylinder also projects into the opening created by the flange and a strong and durable connection is thereby provided.

The ignition system comprises a rotary element or commutator 91 attached to the shaft 1. On the rotary element are eight contacts 92, each one corresponding to one of the cylinders. Bearing against the contacts 92 on the rotary element 91 is a brush 93 suitably mounted on the pillow-block 4 but insulated therefrom. Attached to the brush 93 is a wire 96 leading to the magneto 94, which is mounted on the stationary part of the engine. The magneto is shown at 94, at the left-hand side of Fig. 1, mounted to one side of the top of the housing inclosing the worm gear 40, also shown in Fig. 5, and the magneto is driven through a worm gear 95 meshing with said worm gear 40. The magneto is grounded at 97. Leading from the contacts on the member 91 are a plurality of wires, one of which is shown. These wires lead to the spark plugs of the cylinders. The arrangement of the contacts on the member 91 is such as to fire the cylinders one at a time in the proper sequence, as will be well understood from the wiring diagram of the ignition system shown in Fig. 9.

Fig. 8 is a diagrammatic end view of the engine showing the eight pistons and their connecting rods in their relative positions at one instant in their operation.

From the foregoing description of the drawings, it will be seen that the cylinders and pistons are so located, arranged and connected that each of the eight cylinders fires once during each rotation of the engine, and that each fires so as to start to deliver its power stroke before the piston of the preceding cylinder has completed more than two-thirds of its power stroke. Inasmuch as by far the greater portion of the power or thrust of a piston of an internal combustion engine is delivered within the first two-thirds of its stroke, it will be seen that the above arrangement insures a powerful and smooth-running engine, for there is always one piston exerting its thrust during the first two-thirds of its stroke.

While we have described our invention in what we now believe to be its preferred embodiment, it will be obvious to those skilled in the art, after having understood our invention, that various modifications and changes may be made in the arrangement and construction of the parts without departing from the spirit or scope of our invention, and we aim in the appended claims to cover all such modifications and changes.

Having described this invention, what we claim as new and desire to secure by Letters Patent is:

1. In a rotary internal combustion engine, the combination of a stationary gear, a frame mounted to revolve about the axis of said gear, two crank shafts mounted in said frame, a pinion on each crank shaft geared to said gear and one-half the diameter thereof, four cylinders having pistons operating on each of said crank shafts and means whereby said cylinders are fired so that an impulse is delivered at each 45° about the axis of said stationary gear to rotate said frame.

2. In a rotary internal combustion engine, the combination of a stationary gear, a frame mounted to revolve about the axis of said gear, two crank shafts mounted in said frame, a pinion on each crank shaft in mesh with said gear and one-half the diameter thereof, four cylinders having pistons operating on each of said crank shafts, means whereby said cylinders are fired so that an impulse is delivered at each 45° about the axis of said stationary gear to rotate said frame, and a power shaft rigidly connected with said frame.

3. In a rotary internal combustion engine, the combination of a stationary gear, a frame mounted to revolve around said gear, cylinders on said frame, pistons in said cylinders, crank shafts mounted in said frame and driven by said pistons, a pinion on each crank shaft and in mesh with said stationary gear, a main power shaft rigidly connected with said frame to rotate therewith and a fixed cam shaft surrounding said main power shaft, said cylinders being arranged so that they are fired singly and one at each 45° revolution of said frame.

4. In a rotary internal combustion engine, the combination of a stationary gear, a frame mounted to revolve around said gear, cylinders on said frame, pistons in said cylinders, crank shafts mounted in said frame and driven by said pistons, a pinion on each crank shaft and geared to said stationary gear, a main power shaft rigidly connected with said frame to rotate therewith and a fixed cam shaft surrounding said main power shaft and leaving a space between said cam shaft and main shaft for use as a part of the lubricating system.

5. In a rotary internal combustion engine, the combination of two crank shafts, a main power shaft, a frame rigidly attached thereto, said frame being of general hexagonal shape with two parallel sides thereof substantially longer than the other sides which are equal and 90° with respect to each other, two cylinders mounted on each of said equal sides, pistons for said cylinders, the pistons of the four cylinders on each two adjacent sides being connected to the same crank shaft, and means whereby said cylinders are fired so that a power impulse is delivered for each 45° revolution of said frame and whereby said frame and power shaft are caused to rotate.

6. In an internal combustion engine, the combination of a main shaft, two crank shafts connected therewith, four cylinders having pistons connected with each crank shaft, two of the cylinders on each crank shaft being in the same longitudinal plane but each in a separate transverse plane, the pistons of each two cylinders in the same longitudinal plane being connected 180° apart on their crank shaft and each being connected 90° from each of the other two connected to the same crank shaft, and means for firing each of said cylinders successively and angularly equidistant on each revolution of the frame.

7. In an internal combustion engine, the combination of a main shaft, two crank shafts connected therewith and each adapted to make two revolutions for each revolution of said main shaft, four cylinders having pistons connected to the pistons of each crank shaft, each two adjacent cylinders being connected 90° apart on their crank shaft, and means whereby the cylinders on one crank shaft successively deliver an impulse for each 90° rotation thereof whereupon the cylinders on the other crank shaft likewise successively deliver an impulse for each 90° revolution thereafter of the second crank shaft.

8. In a rotary internal combustion engine, the combination of a stationary gear, a rotary drive shaft mounted concentric with the gear and having an enlarged portion, said shaft having an axial passage extending to said portion and having one or more openings thereto at said enlarged portion, a frame rigidly secured to said shaft at said enlarged portion to rotate with the shaft, a plurality of pinions journaled on said frame and geared to said stationary gear, a plurality of cylinders rigidly mounted on said frame to rotate therewith, there being a group of cylinders for each pinion, a piston in each cylinder and means operatively connecting the pistons of each group of cylinders to one of the pinions to rotate the pinions and thereby rotate the shaft and frame, said connections between the pinions and their driving pistons being such that no two cylinders fire simultaneously, means having passages communicating with the openings in the enlarged portion of said shaft and with the cylinders for conveying hydrocarbon fuel from said enlarged portion of the shaft to the cylinders, and means for controlling the fuel mixture supplied to the cylinders.

9. In a rotary internal combustion engine, the combination of a stationary member having a stationary gear secured thereto, a rotary drive shaft concentric with said stationary member and journaled at one end therein, said shaft having an enlarged portion, means secured to said enlarged portion to rotate therewith, a plurality of pinions journaled on said last means and geared to said stationary gear, a plurality of cylinders mounted concentrically of said gear to rotate together with said means about the axis thereof, there being a group of four cylinders for each pinion, pistons in said cylinders, means connecting the pistons of each group of cylinders to one of said pinions to rotate the pinions for driving the cylinders and shaft rotatably, said connections between the pinions and their driving pistons being such that no two cylinders fire simultaneously, and means for conveying and controlling fuel mixture to the cylinders.

10. In a four-cycle rotary internal combustion engine, the combination of a stationary gear, a rotary drive shaft concentric to said gear, a frame secured to said drive shaft to rotate therewith, a plurality of pinions journaled on said frame and geared to said gear, a crank shaft for each of said pinions arranged longitudinally of said drive shaft, a plurality of cylinders mounted on said frame concentric about the axis thereof, there being a group of cylinders for each pinion, pistons in said cylinders, means connecting the pistons of each group of cylinders to one of said crank shafts to rotate the pinions for driving the shaft rotatably, said piston connection for each group of cylinders being such that no two cylinders exert their thrust synchronously, and means for conveying and controlling fuel mixture to the cylinders.

11. In a four-cycle rotary internal combustion engine, the combination of a stationary gear, a rotary shaft concentric with the gear, means secured to said shaft to rotate therewith, a plurality of pinions journaled in said means and spaced at substantially equal angles about said axis and geared to the stationary gear, a plurality of cylinders mounted concentrically of said axis to rotate together with said means about said axis, there being four cylinders for each pinion, pistons in said cylinders, means connecting the pistons of each group of cylinders to one of said pistons to rotate the pinions for driving the shaft and cylinders rotatably about said axis, said connection between a pinion and its pistons being such that when one of said pistons is on its inner stroke another is on its outer stroke and the other two are in between, and means for conveying and controlling fuel mixture to the cylinders.

12. In a four-cycle rotary internal combustion engine, the combination of a stationary gear, a rotary shaft concentric with the gear, means secured to said shaft to rotate therewith, a plurality of pinions journaled in said means and spaced at substantially equal angles about said axis and geared to the stationary gear, a plurality of groups of four cylinders each mounted concentrically of said axis to rotate together with said means about said axis, pistons in said cylinders, each group of pistons being connected to one of the pinions to rotate the same for driving the shaft and cylinders rotatably about said axis, four cranks for each group of pistons arranged 90° apart for connecting the same to their pinion, and means for conveying and controlling fuel to the cylinders.

13. In a rotary internal combustion engine, the combination of a main power shaft, a cam shaft surrounding said power shaft and leaving a space between said shafts, a stationary member having an opening therein in communication with the space between said shafts, a frame attached to the power shaft, a plurality of crank shafts mounted in said frame, each of said crank shafts having an opening longitudinally therethrough, means connecting the openings in said crank shafts with the space between the power and cam shafts, an oil pump, means for connecting said pump with the opening in said stationary member and means connecting the crank shafts at one end with said pump.

14. In a rotary internal combustion engine, the combination of a main shaft, a stationary cam shaft surrounding said shaft with a space between, an enlarged portion on said shaft, a frame with cylinders thereon rigidly connected to said enlarged portion, a plurality of crank shafts mounted in said frame and a passage through each of said crank shafts connecting with the space between said main shaft and cam shaft for supplying lubricant to the crank shafts.

15. In a rotary internal combustion engine, the combination of a main shaft, a stationary cam shaft surrounding said shaft with a space between, an enlarged portion on said shaft, a frame with cylinders thereon rigidly connected to said enlarged portion, a plurality of crank shafts mounted in said frame and a passage through each of said crank shafts, passages in the enlarged portion of the main shaft leading from the space between the main shaft and cam shaft to the passages through each crank shaft.

16. In a rotary internal combustion engine, the combination of a stationary gear, a frame mounted to revolve around said gear, cylinders on said frame, pistons in said cylinders, crank shafts mounted in said frame and driven by said pistons, a pinion on each crank shaft geared to said stationary gear, a main power shaft rigidly connected with said frame to rotate therewith, and a cam shaft surrounding said main power shaft, said cylinders being arranged so that they are fired one at each 45-degree revolution of said frame with respect to said cam shaft.

17. In a rotary internal combustion engine, the combination of a rotary drive shaft, a frame secured at one end to the shaft to rotate therewith and journaled at its other end about said shaft, a stationary gear concentric with said shaft and located at said journaled end of said frame, said frame having bearings therein for crank shafts, a plurality of crank shafts journaled in said crank shaft bearings, a pinion for each crank shaft geared to said stationary gear, a plurality of cylinders mounted on said frame concentric about the axis thereof, there being a group of cylinders for each pinion, pistons in said cylinders, means connecting the pistons of each group of cylinders to one of said pinions to rotate the pinions for driving the frame and shaft, the connections between the crank shafts and their driving pistons being such that the pistons do not exert their thrust synchronously, a stationary cam sleeve extending from said stationary gear inwardly along the shaft, and means operatively related thereto for controlling the cylinder valves.

18. In a rotary internal combustion engine, the combination of a rotary drive shaft, a stationary gear concentric with said shaft and located near one end thereof, a frame secured to the shaft at the other end thereof to rotate therewith and extending along the shaft to the gear, a bearing for the frame at the inner end of the gear, and a bearing for the shaft beyond the gear, the rotating frame having bearings therein for crank shafts, the crank shaft bearings at one end lying concentrically of and substantially in transverse alinement with the said bearing for the rotary frame, a plurality of crank shafts extending along the main shaft and journaled in said crank shaft bearings, a pinion for each crank shaft geared to said stationary gear, a plurality of cylinders mounted on said rotary frame concentrically about the axis thereof, pistons in said cylinders, and means connecting the pistons with said crank shafts to drive the frame and drive shaft.

In testimony whereof, we have signed our names to this specification.

FREDERICK R. SUNDERMAN.
WALTER H. SHIMPF.